United States Patent
Wang et al.

(10) Patent No.: US 6,553,441 B1
(45) Date of Patent: Apr. 22, 2003

(54) METHOD AND APPARATUS FOR USING SERIAL BUS FOR PC MANAGEMENT

(75) Inventors: Chi-Lie Wang, Sunnyvale, CA (US); Eric Davis, Sunnyvale, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/451,636

(22) Filed: Nov. 30, 1999

(51) Int. Cl.$^7$ .................................................. G06F 1/30
(52) U.S. Cl. ......................... 710/64; 713/300; 709/250
(58) Field of Search ................................ 709/239–250; 710/36–38, 59–64; 713/300–340; 714/48.52

(56) References Cited

U.S. PATENT DOCUMENTS

| | | | | |
|---|---|---|---|---|
| 5,896,512 A | * | 4/1999 | Einbinder et al. | 709/250 |
| 5,938,771 A | * | 8/1999 | Williams et al. | 713/310 |
| 6,128,658 A | * | 10/2000 | McLean | 709/224 |
| 6,438,429 B1 | * | 8/2002 | Ho et al. | 700/22 |
| 6,477,567 B1 | * | 11/2002 | Ohara | 709/223 |

OTHER PUBLICATIONS

"3Com®EtherLink® 10/100 Mbps Desktop Network Interface Cards", product specification guide, 3Com Corporation, Santa Clara, CA, copyright 1999, 6 pages.
Toigo, J.W., "Neat NICs", *Solutions Integrator*, vol. 3, No. 4, Apr. 1999, Enabling the New Enterprise, 5 pages.
"Dynamics*Access*®  Technology—Increasing  Network Availability, Performance, Ease of Use, and Manageability", technology/services guide, 3Com Corporation, Santa Clara, CA, copyright 1999, 3 pages.
"The NEW 3Com Fast EtherLink® XL PCI For Complete PC Management", product specification guide, 3Com Corporation, Santa Clara, CA, copyright 1999, 1 page.
"Dynamic*Access*® Managed PC Solutions—Lower the cost of PC ownership with Desktop Management Interface (DMI 2.0s)", product specification guide, 3Com Corp., Santa Clara, CA, copyright 1999, 2 pp.
"Dynamic*Access*® Managed PC Solutions—Now you can wake up PCs from a central management station", product specification guide, 3Com Corp., Santa Clara, CA, copyright 1999, 1 p.
"Desktop Management—Centralized Control Across Distributed Systems", technology/services guide, 3Com Corp., Santa Clara, CA, copyright 1999, 11 pp.
"3Com Managed PC Solutions—Lowering Total Cost of PC Ownership", technology/services guide, 3Com Corp., Santa Clara, CA, copyright 1999, 5 pp.
"Introducing the 3CR990–TX–97 10/100 PCI NIC with 3XP processor", product specification guide, 3Com Corp., Santa Clara, CA, copyright 1999, 4 pp.
"10/100 Mbps Fast Ethernet PCI Network Interface Card 100 Mbps Performance Benchmark Comparison", LANQuest, Fremont, CA, Jan. 1998, 4 pp.
"3Com® Eliminates Network Problem 'Finger Pointing'", news and events, 3Com Corporation, Santa Clara, CA, Jun. 1999, 3 pp.

\* cited by examiner

*Primary Examiner*—Christopher B. Shin
(74) *Attorney, Agent, or Firm*—McDonnell Boehnen Hulbert & Berghoff (57) ABSTRACT

A serial bus with pre-defined protocol may be used on the NIC to provide PC management functions. While these functions may be used with the PC powered up, they may further perform valuable tasks while the PC is powered down. With these new added functions, centralized control may be achieved which will lower the administrative cost and serve better for distributed computing.

14 Claims, 8 Drawing Sheets

Write

| S | Slave Address | Wr | A | Command Code | A | Byte Count = N | A | Data Byte 1 | A | Data Byte 2 | A | ... | A | Data Byte N | A | P |
|---|---|---|---|---|---|---|---|---|---|---|---|---|---|---|---|---|
| 1 | 7 | 1 | 1 | 8 | 1 | 8 | 1 | 8 | 1 | 8 | 1 | | 1 | 8 | 1 | 1 |

Read

| S | Slave Address | Wr | A | Command Code | A | S | Slave Address | Rd | A | Byte Count = N | A | Data Byte 1 | A | Data Byte 2 | A | ... | A | Data Byte N | Ā | P |
|---|---|---|---|---|---|---|---|---|---|---|---|---|---|---|---|---|---|---|---|---|
| 1 | 7 | 1 | 1 | 8 | 1 | 1 | 7 | 1 | 1 | 8 | 1 | 8 | 1 | 8 | 1 | | 1 | 8 | 1 | 1 |

Notes:
1. S - Start, Wr - Write, Rd - Read, A - Ack, P - Stop.
2. 8-bit command codes is used as an offset to address the registers, TPB and RPB.

METHOD AND APPARATUS FOR USING SERIAL BUS FOR PC MANAGEMENT

CROSS-REFERENCE TO RELATED APPLICATIONS

The present application is related to copending U.S. patent application Ser. No. 09/465,984, filed Dec. 16, 1999, entitled Multi-Function Transmit Packet Buffer; and U.S. patent application Ser. No. 09/451,485, filed Nov. 30, 1999, entitled Method and Apparatus for NIC Resources Without Main Power. Each of the above-cited applications is incorporated herein by reference in its entirety.

BACKGROUND OF THE INVENTION

1. Field of the Invention

The present invention relates to network interface cards. More particularly, the present invention relates to network interface cards having an alternate connection to the PC to allow more effective management of the PC.

2. Description of Related Art

Network interface cards allow a PC to be connected to and exchange information with a network.

In addition, network interface cards may perform additional duties such as perform management of the PC.

Typically, network interface cards are connected to the PC only through the host interface, such as an ISA or PCI bus.

Drawbacks include the inability to manage the PC when the PC is turned off.

What is needed is a network interface card which allows remote management of the PC even when the PC is turned off and there is no power to the host interface.

SUMMARY OF THE INVENTION

The present invention is directed towards a network interface card. The network interface card comprises a PCI bus interface for controlling data exchange between the network interface card and a PCI host, the PCI bus interface using a main power source and a PCI clock signal, and a serial bus interface for controlling data exchange between the network interface card and a serial host, the serial bus interface capable of allowing the serial host to access resources on the network interface card when the main power source is unavailable.

DETAILED DESCRIPTION OF THE INVENTION

Figure 1:
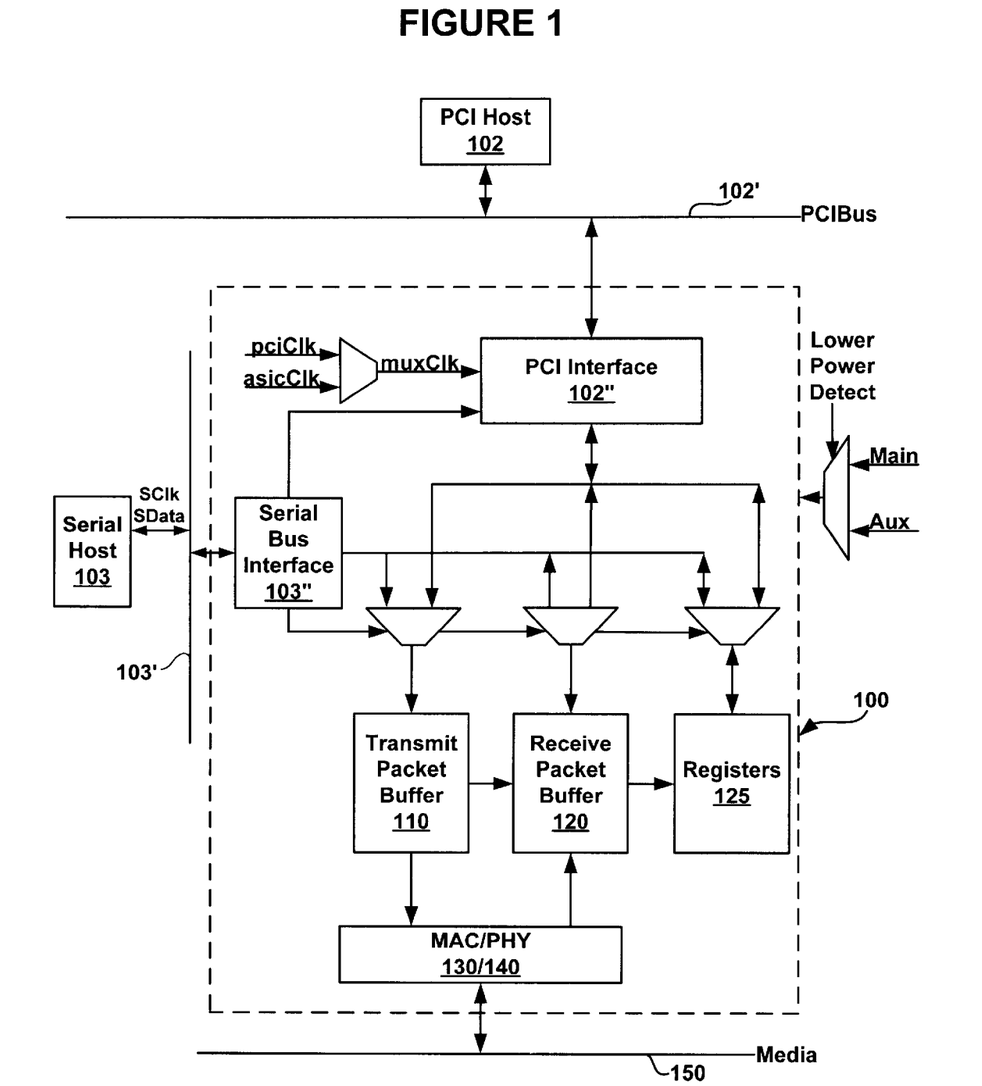
FIG. 1 shows one embodiment of a network interface card of the present invention.

FIG. 1 shows one embodiment of a NIC (network interface card) 100 of the present invention. NIC 100 includes a TPB (transmit packet buffer) 110, a MAC (media access controller) 130, a PHY (physical layer interface) 140, a RPB (receive packet buffer) 120, and registers 125.

NIC 100 may be connected to a PCI host 102 through a PCI bus 102' and a PCI interface 102". NIC 100 may also be connected to a serial host 103 through a serial bus 103' and a serial bus interface 103".

Packets to be transmitted are downloaded from a host to TPB 110. From TPB 110, the packets are forwarded to MAC 130, which converts the packets to conform with the network protocol. The network protocol may be IEEE 802.3 Data Link layer protocol or any other suitable protocol. From MAC 130, the packets go through PHY 140 and onto the media 150. Packets to be received go through PHY 140 and MAC 130 before being written into RPB 120. From RPB 120, the packets are uploaded to the host.

PCI bus interface 102" may include a PCI bus slave and a PCI bus master. PCI bus slave determines whether to accept a transaction initiated from PCI host 102. This transaction will be used to initialize the registers of NIC 100, check status, handle interrupts, and control data movement. PCI bus master downloads the packets to be transmitted and uploads the packets to be received through PCI bus 102'.

Each packet consists of multiple fragments and each fragment can be located in different chunks of host memory. Data downloading is started by fetching the address and the length information for each fragment, followed by downloading the packet data from the host memory to TPB 110. This process repeats until all of the fragments within a packet and all of the packets are downloaded. Data uploading is handled similarly to data downloading except the direction of the data is reversed. Instead of downloading the packet data from the host memory to TPB 110, data is uploaded from RPB 120 to the host memory.

To save power, the PC may be powered down after a period of non-use or as configured by the user. Main power may be removed to minimize power consumption. If power to PCI bus interface 102" is cut off, then an auxiliary power source with a constantly running asicClk may be provided to the PCI clock domain functional blocks. This auxiliary power source will allow NIC resources to be accessed through one or more alternate paths. Main power and auxiliary power may be built into the same power supply for the PC. Keep-alive packets may be sent out to refresh the presence of NIC 100 in the routing table for the router, which will prevent NIC 100 from dropping out of the network. Alert-on-LAN packets may also be transmitted to report any abnormal conditions encountered. A wake up event or restarting the PC will restore main power and allow the PC to return to normal operation mode.

PC management can be performed while the PC is either in the normal operation mode or in the power down mode. Serial bus 103' can be used to perform the desired management functions. The scheme presented here is especially useful while the PC is powered down because the PCI bus is not available to initiate an access if the PCI power is not supplied.

While the PC is in the normal mode, there are a few management tasks which can be performed. The first task is to access registers 125. This task can be used for NIC diagnostics, status monitoring, and enabling specific functions. The second task is to download transmit packets through TPB 110. This task can be used to send out the alert messages to the remote console upon detecting any abnormal conditions such as temperature and voltage over limit; fan stop running, or case intrusion.

In addition to the above management functions, there are even more to be performed while the PC is powered down. The first one is to download and send out keep-alive packets in predefined intervals. This packet is used to refresh the NIC's presence in the router's routing table, which will ensure that it will not be dropped out of the router while the PC is powered down. The second one is to upload received packets and process them to determine whether to wake up the system. Normally, a wake up event received will cause assertion of the PME and wake up the PC. With the serial bus in place, a serial bus interface can upload the packets and process them to determine whether to discard the packet, or to assert the PME for system wake up.

Figure 2:
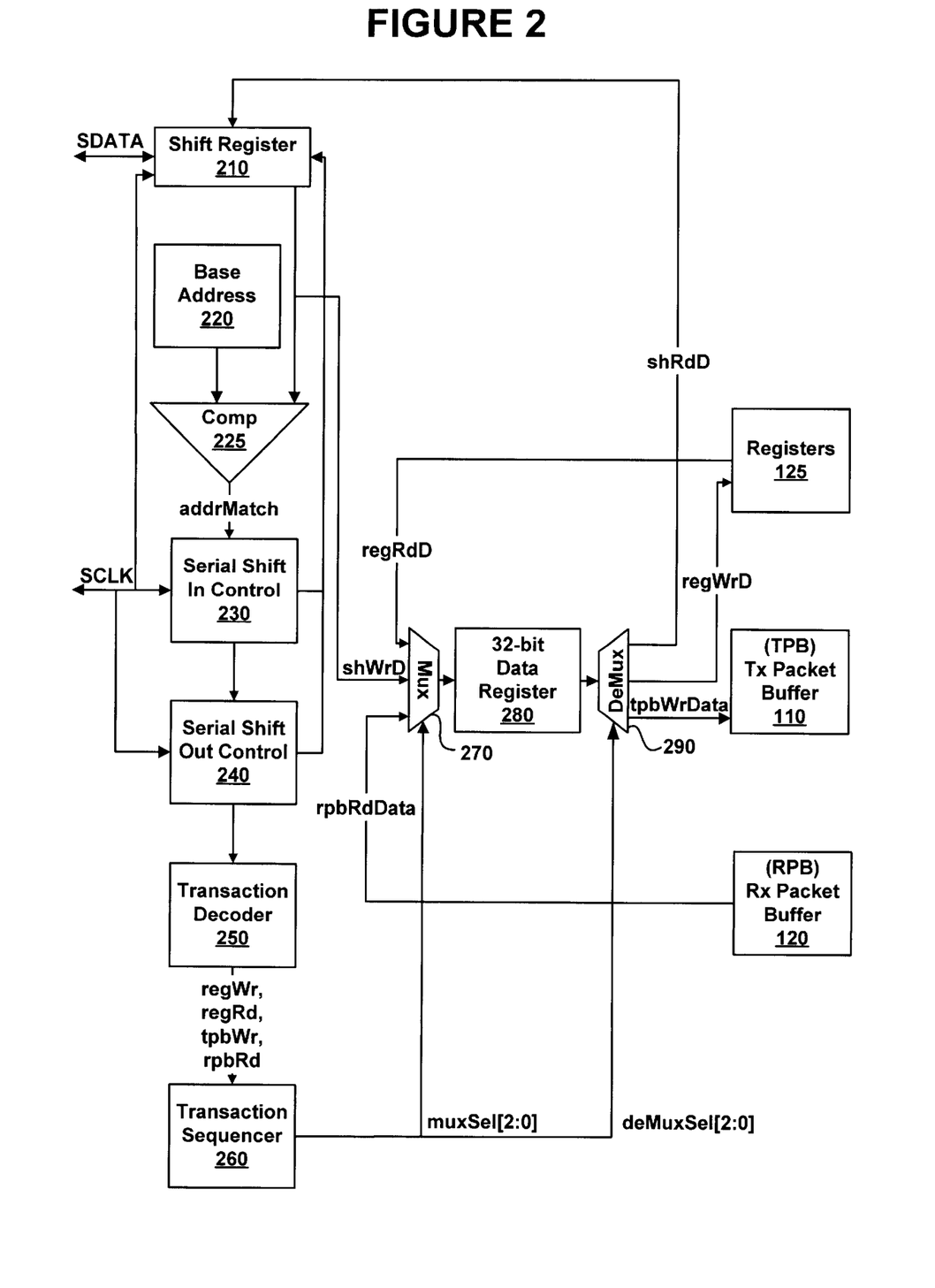
FIG. 2 shows one embodiment of a serial bus interface suitable for use with the network interface card of the present invention.

FIG. 2 shows one embodiment of a serial bus interface suitable for use with the network interface card of the present invention. Serial bus interface 103" includes a shift register 210, a base address register 220, a shift in control 230, a shift out control 240, a transaction decoder 250, a transaction sequencer 260, a data multiplexer 270, a data register 280, and a data demultiplexer 290. Serial bus interface 103" provides an alternate access path to registers 125. This access may be used for diagnostic purposes, sending out keep-alive and alert-on-LAN packets, and receiving wake-up packets for system wake-up.

Figure 3:
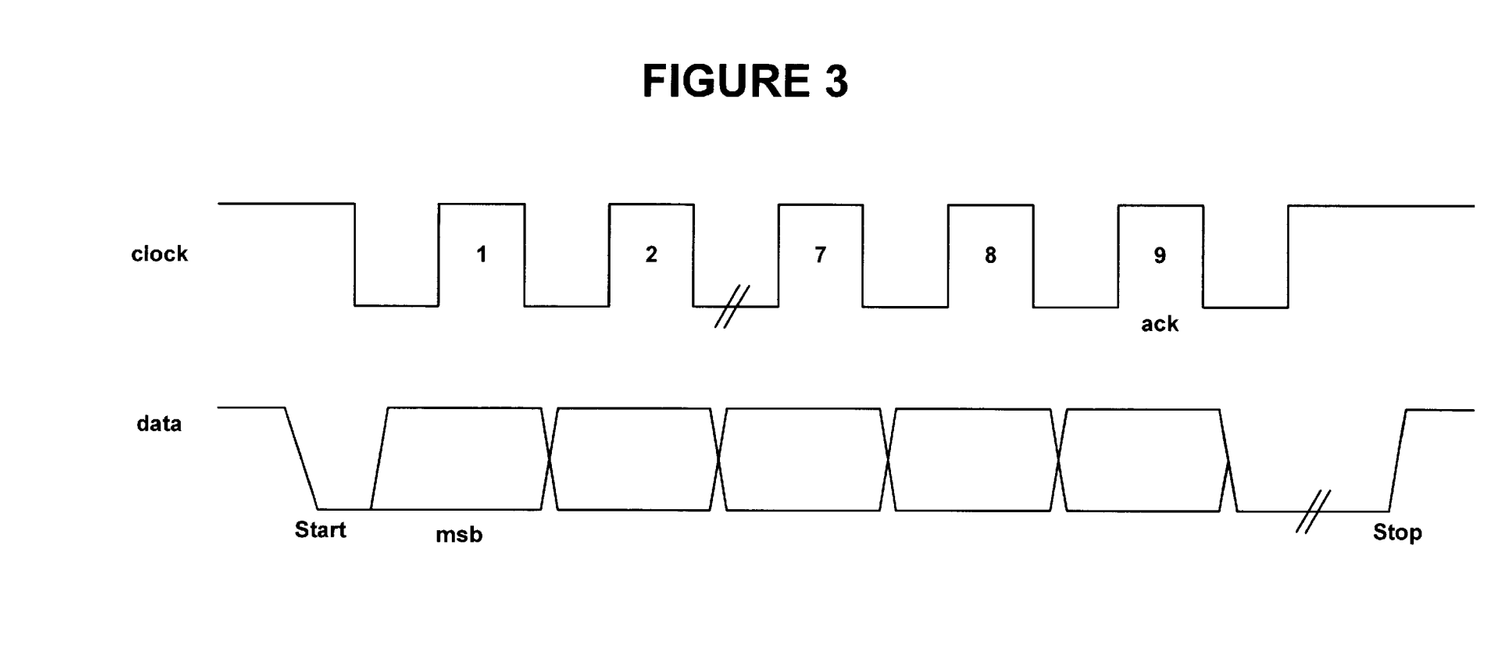
FIG. 3 shows one embodiment of a serial bus bit format suitable for use with the serial bus interface of the present invention.

FIG. 3 shows one embodiment of a serial bus bit format suitable for use with the serial bus interface of the present invention. The serial bus consists of a clock and a data signals. A transaction may be initiated by a Start condition (data switches from high to low while clock is high), followed by a series of data phases. Each data phase may consist of eight data bits and one acknowledge bit. As a serial bus receiver, while 8 data bits are shifted in, the acknowledge bit may be shifted out to acknowledge the transfer. For a serial bus transmitter, the directions of the data bits and acknowledge bit may be reversed. The transaction may be ended with a Stop condition (data switches from low to high while clock is high).

Figure 4:
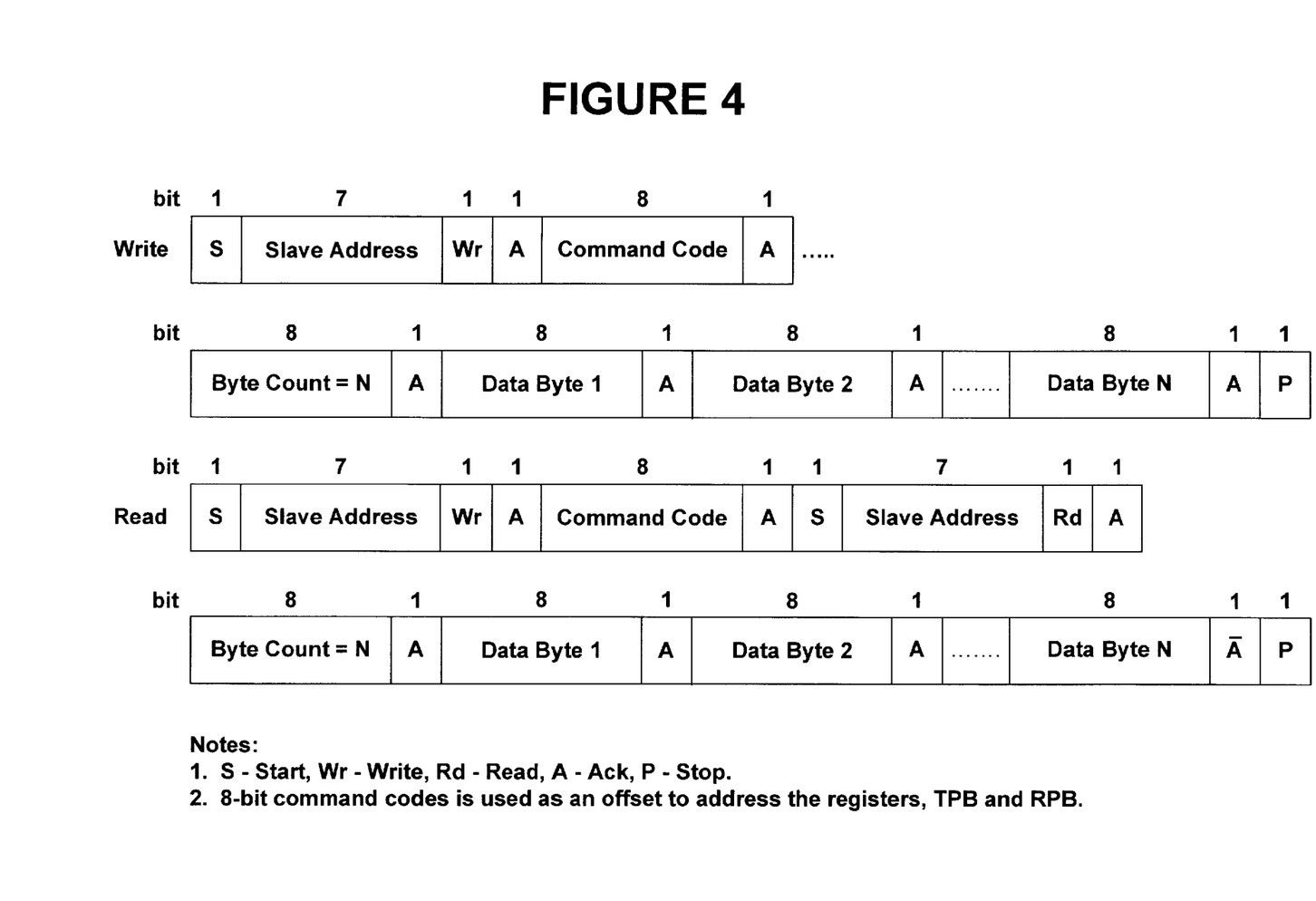
FIG. 4 shows one embodiment of a serial bus protocol suitable for use with the serial bus interface of the present invention.

FIG. 4 shows one embodiment of a serial bus protocol suitable for use with the serial bus interface of the present invention. NIC resources may be accessed through the PCI bus with 32-bit data path. In order for the resources to be accessed through the serial bus, a pre-defined serial bus protocol may need to be added on top of the serial bus bit format to support the access. A transaction may be started with a Start condition, followed by a slave address cycle, which may be used to compare the base address and determine whether the NIC should respond the access. After the slave address cycle, a command cycle may be initiated to identify which resource of the NIC is accessed. All the registers may be accessed for diagnostic purposes, keep-alive and alert-on-LAN packets may be downloaded to the TPB, and any of the received packets may also be uploaded. Following the command cycle, a byte count cycle may be used to determine the accessed size. For a register access, 8-bit, 16-bit and 32-bit may be used to access the addressed register. For TPB downloading, the byte count may be used to specify the burst size of the packet. For RPB uploading, the byte count may also indicate the burst size for the packet to be uploaded. Finally, the data cycles follow which may represent the data to be written into or read from the accessed NIC resources.

Shift register 210 shifts in (as a serial bus receiver) and shifts out (as a serial bus transmitter) the serial bus data. Shift register 210 may be an 8-bit register. Data shifted in may be a slave address, command codes, byte count, or data bytes to be written into registers 125 or TPB 110. Data shifted out may be byte count or data bytes read from registers 125 or RPB 120.

Base address register 220 stores the serial bus base address for NIC 100. Because a system may have multiple serial bus devices, a unique serial bus base address needs to be assigned to each of the serial bus devices. Upon receiving a serial bus access, comparator 225 compares the serial bus address for NIC 100 with the incoming slave address. If a match is found, NIC 100 will acknowledge the access. Otherwise, NIC 100 will ignore the access.

Figure 5:
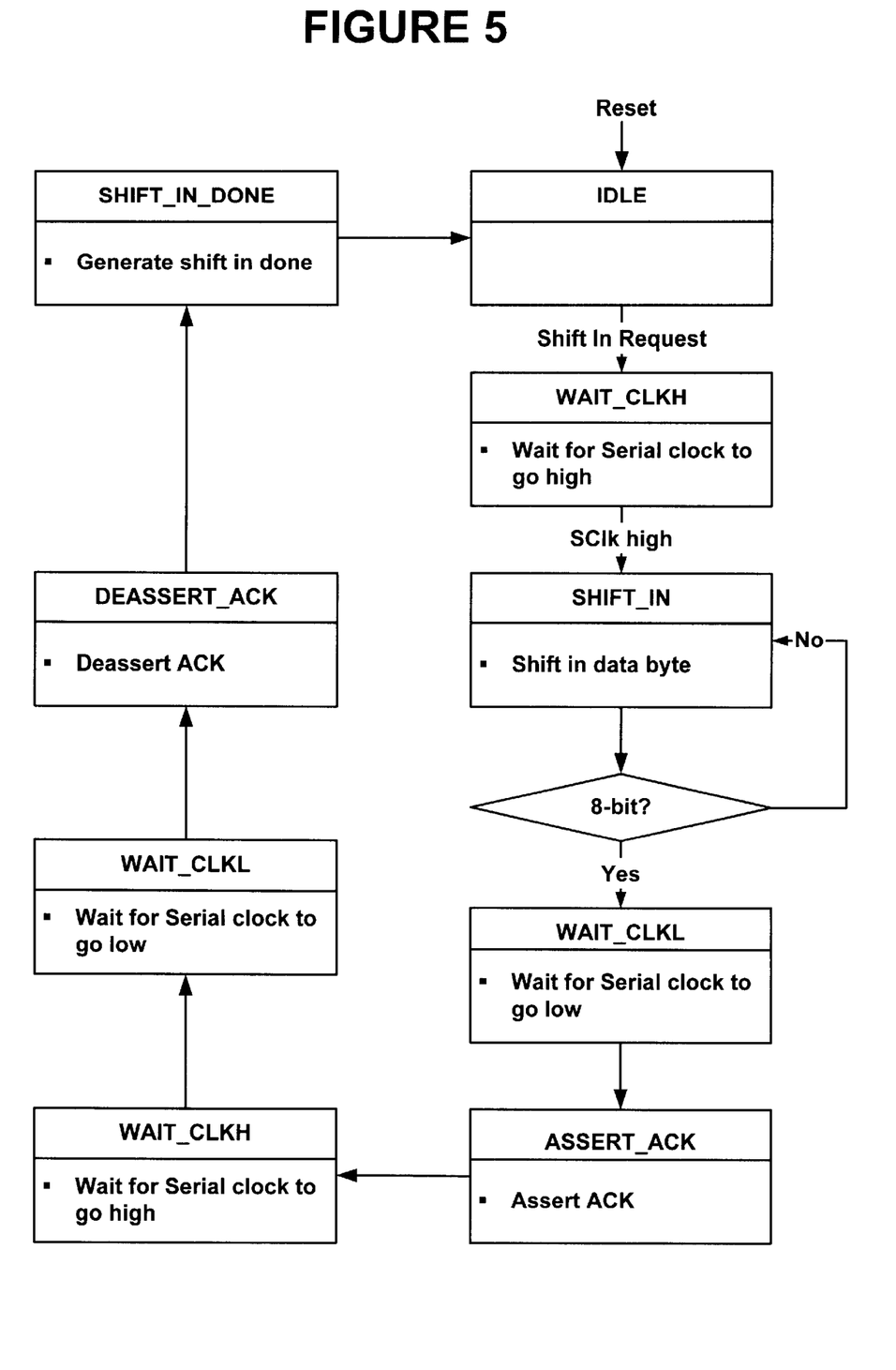
FIGS. 5–6 show embodiments of state diagrams for a shift in control and a shift out control, respectively.
Figure 6:
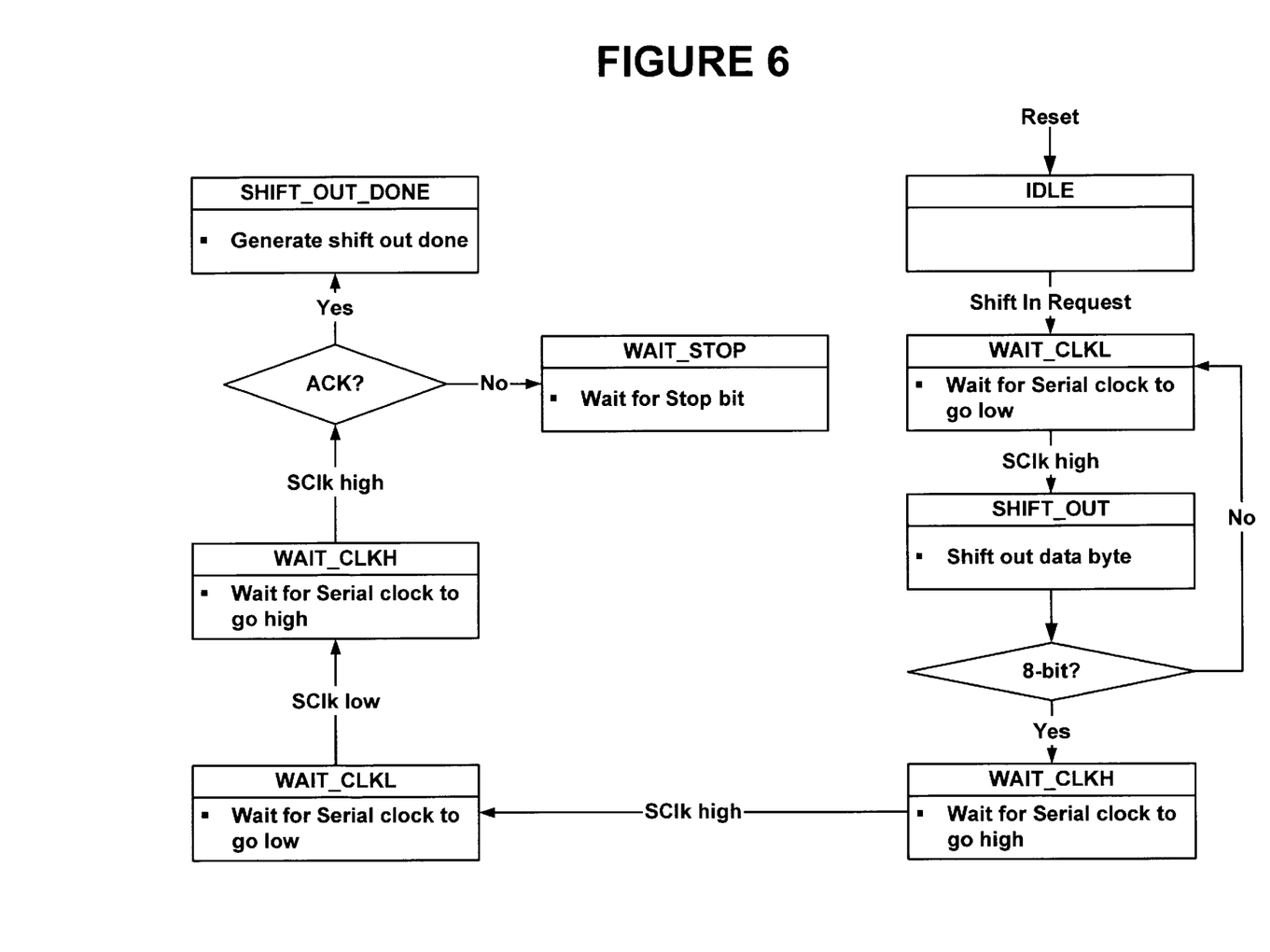

FIGS. 5–6 show embodiments of state diagrams for a shift in control and a shift out control, respectively. Shift in control 230 shifts in 8-bit data bit by bit (SHIFT_IN) and generates the acknowledgment (ASSERT_ACK) upon each byte received. Each byte shifted in may be a slave address, command codes, byte count, or data as defined in the serial bus protocol. The first wait clock high state (WAIT_CLKH) ensures that the valid shift-in data can be sampled after the clock goes high. The first wait clock low state (WAIT_CLKL) provides a half cycle set up time before driving the acknowledge signal (ACK). The second wait clock high state (WAIT_CLKH) ensures the acknowledge signal stays driven. The second wait clock low signal (WAIT_CLKL) ensures a half cycle hold time for the acknowledge signal after the clock goes low.

Shift out control 240 waits for the serial clock to go low (WAIT_CLKL) before shifting out 8-bit data bit-wise (SHIFT_OUT) and checks the acknowledgment (ACK) for each byte shifted out. The data byte shifted out may represent the byte count or data as defined in the serial bus protocol. The first wait clock low state (WAIT_CLKL) provides a half cycle set up time for shift-out data. The remaining three wait clock states (WAIT_CLKH, WAIT_CLKL, WAIT_CLKH) wait for the acknowledge cycle and when the clock goes high for a valid acknowledge signal to come back.

Transaction decoder 250 decodes the command codes and determines the type of transaction. Registers 125, TPB 110, and RPB 120 may all be accessed through serial bus 103". The lowest bit of the slave address cycle may also be used to indicate the direction of the access (read or write).

Figure 7:
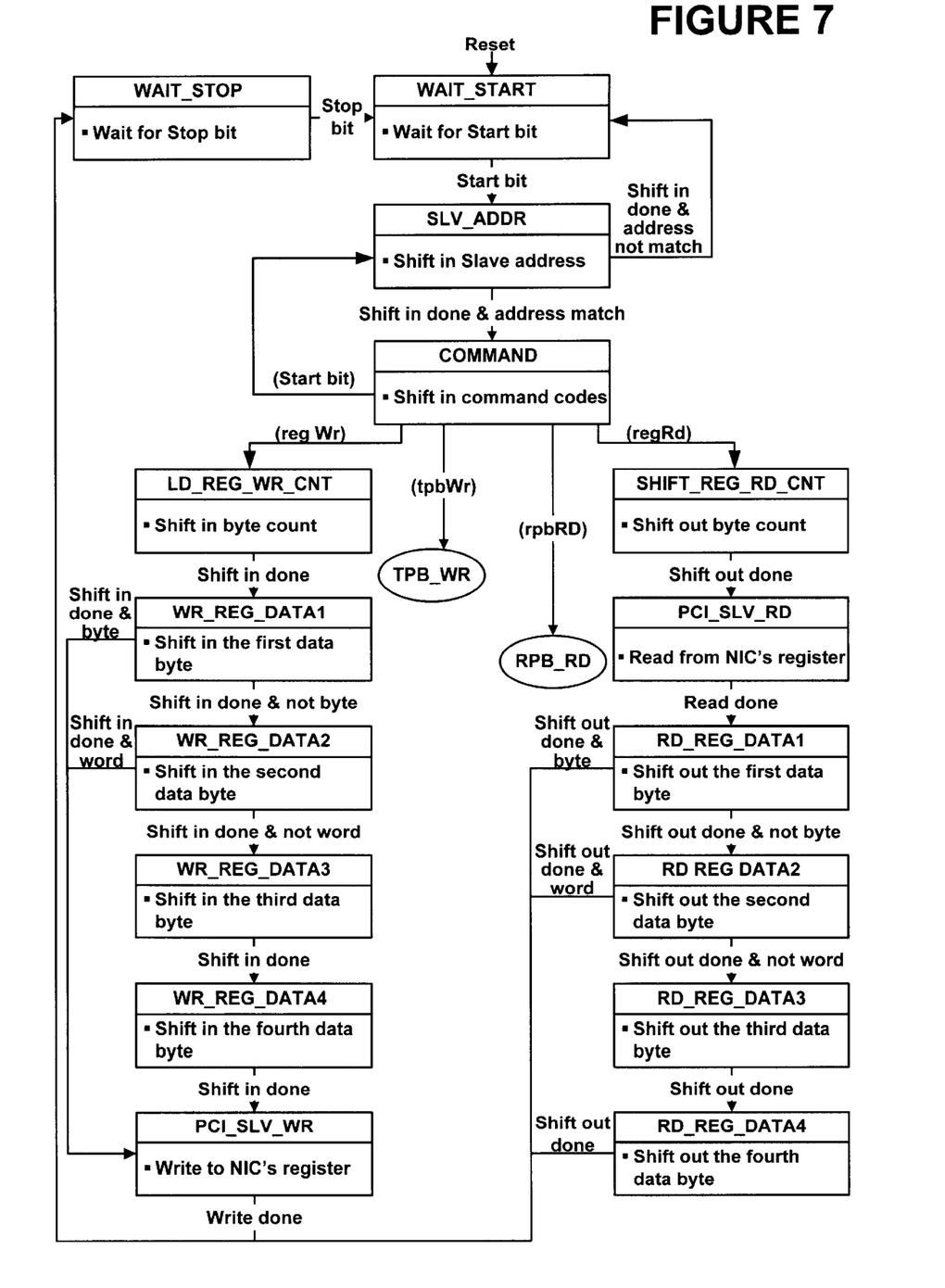
FIGS. 7–8 shows a one embodiment of a state diagram for a transaction sequencer.
Figure 8:
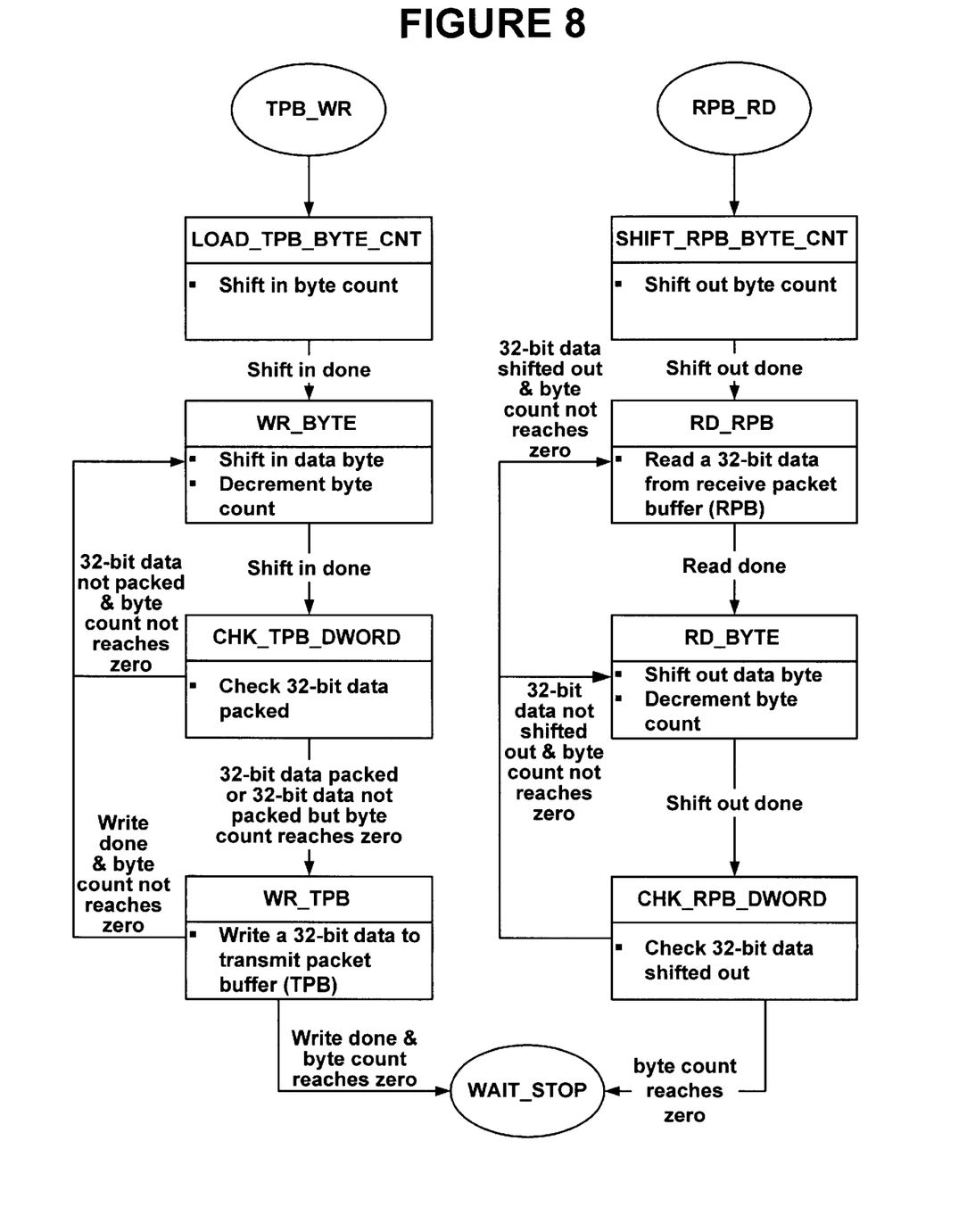

FIGS. 7–8 show an example of a state diagram for a transaction sequencer. Transaction sequencer 260 sequences through the accesses depending on the accessed NIC resource. For a register write access (regWr), transaction sequencer 260 shifts in the slave address (SLV_ADDR), command codes (COMMAND), byte count (LD_REG_WR_CNT), and finally the data to be written into registers 125 (WR_REG_DATA1, WR_REG_DATA2, WR_REG_DATA3, WR_REG_DATA4). After the data are shifted in and packed into data register 280, PCI interface 102" is notified to write the data into registers 125 (PCI_SLV_WR).

For a register read operation (regRd), transaction sequencer 260 shifts in the slave address (SLV_ADDR) and command codes (COMMAND) as in the register write operation. After the accessed register is addressed, transaction sequencer 260 will re-initiate the slave address cycle with a read indication, and then shift out the byte count (SHIFT_REG_RD_CNT). Registers 125 of NIC 100 will be accessed through PCI interface 102" (PCI_SLV_RD) until the data is available (read done) will be returned from PCI interface 102". This data will be stored in a 32-bit data register before shifted out byte by byte (RD_REG_DATA1, RD_REG_DATA2, RD_REG_DATA3, RD_REG_DATA4) through serial bus 103'.

For a TPB download operation (tpbWr), transaction sequencer 260 shifts in the slave address (SLV_ADDR), command codes (COMMAND) which will be used to address RPB 120, another slave address cycle to indicate a read operation, and then a byte count (LOAD_TPB_BYTE_CNT) to indicate the burst size. Transaction sequencer 260 then shifts in data byte by byte (WR_BYTE). The data is packed into a 32-bit data register (CHK_TPB_DWORD) before getting written into TPB (WR_TPB). This process repeats until all of the data bytes are downloaded into TPB 110.

For a RPB upload operation (rpbRD), transaction sequencer 260 shifts in the slave address (SLV_ADDR), command codes (COMMAND), and a byte count (SHIFT_RPB_BYTE_CNT) to indicate the burst size. 32-bit data is read out of the RPB (RD_RPB) and stored into the 32-bit data register. This data is unpacked byte-wide and shifted out through the serial bus (CHK_RPB_DWORD). This process repeats until all the data are uploaded from RPB 120.

Data multiplexer 270 multiplexes in the data to be written into the 32-bit data register. There are three different sources of the data: the first one is from the 8-bit data which shifted in through serial bus 103', the second one is the data read out of the NIC's register, and the last one is the 32-bit data from RPB 120.

Data register 280 packs and unpacks the data. Data register 280 may be a 32-bit register. The data which gets multiplexed in will be stored into this data register. For a register write operation, after the data is stored here, it may be forwarded to the accessed register. For a TPB download operation, the data may be packed into 32-bit quantities before getting written into TPB 110. For a RPB upload operation, the data may be read out 32-bit at a time. It may be stored into this data register and unpacked 8-bit at a time before getting shifted out onto serial bus 103'.

Data demultiplexer 290 distributes the data from data register 280 to one of the three different destinations. The first one is the register input, the second one is the TPB input, and the last one is the 8-bit shift register input.

A serial bus with pre-defined protocol may be used on the NIC to provide PC management functions. While these functions may be used with the PC powered up, they may further perform valuable tasks while the PC is powered down. With these new added functions, centralized control may be achieved which will lower the administrative cost and better serve for distributed computing.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

What is claimed is:

1. A network interface card, comprising:
    a PCI bus interface for controlling data exchange between the network interface card and a PCI host, the PCI bus interface using a main power source and a PCI clock signal; and
    a serial bus interface for controlling data exchange between the network interface card and a serial host, the serial bus interface capable of allowing the serial host to access resources on the network interface card when the main power source is unavailable.

2. The network interface card of claim 1, wherein the serial bus interface is capable of using an auxiliary power source when the main power source is unavailable.

3. The network interface card of claim 1, wherein the serial bus interface is capable of using an ASIC clock signal when the PCI clock signal is unavailable.

4. The network interface card of claim 1, wherein the resources include registers.

5. The network interface card of claim 1, wherein the resources include a transmit packet buffer.

6. The network interface card of claim 1, wherein the resources include a receive packet buffer.

7. The network interface card of claim 1, wherein the serial bus interface includes:
    a comparator for detecting an access addressed to the network interface card;
    a shift register for shifting data in and out of the resources; and
    a transaction sequencer for controlling the transactions between the shift register and the resources.

8. The network interface card of claim 1, wherein the serial bus interface allows the resources to be diagnosed through the serial bus host while the main power source is unavailable.

9. The network interface card of claim 1, wherein the serial bus interface is capable of transmitting packets to a network while the main power source is unavailable.

10. The network interface card of claim 1, wherein the serial bus interface is capable of receiving packets from a network while the main power source is unavailable.

11. A method for using a serial bus to access resources on a network interface card, the method comprising:
    providing a serial bus interface for controlling data exchange between the network interface card and a serial host, the serial bus interface capable of allowing the serial host to access resources on the network interface card when a main power source is unavailable;
    providing an auxiliary power source to the serial bus interface when the main power source is unavailable;
    providing an ASIC clock signal to the serial bus interface when a PCI clock signal is unavailable;
    detecting an access addressed to the network interface card from the serial host; and
    servicing the access between the network interface card and the serial host.

12. The method of claim 11, wherein the resources include registers.

13. The method of claim 11, wherein the resources include a transmit packet buffer.

14. The method of claim 11, wherein the resources include a receive packet buffer.

* * * * *